United States Patent [19]
Stephen et al.

[11] Patent Number: 5,832,582
[45] Date of Patent: *Nov. 10, 1998

[54] APPARATUS FOR ALIGNING TWO MEMBERS

[75] Inventors: Graham Stephen; Robert Stephen, both of Peterhead, Great Britain

[73] Assignee: Future Alignments Limited of Anderson House, Aberdeenshire, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 669,398

[22] PCT Filed: Jan. 9, 1995

[86] PCT No.: PCT/GB95/00036

§ 371 Date: Jul. 8, 1996

§ 102(e) Date: Jul. 8, 1996

[87] PCT Pub. No.: WO95/18933

PCT Pub. Date: Jul. 13, 1995

[30] Foreign Application Priority Data

Jan. 8, 1994 [GB] United Kingdom .................... 9400277
Aug. 5, 1994 [GB] United Kingdom .................... 9415848

[51] Int. Cl.⁶ ..................................................... B25B 27/14
[52] U.S. Cl. ............................................... 29/272; 29/271
[58] Field of Search ............................. 29/270, 271, 272, 29/274, 281.5; 269/37, 42, 43, 45

[56] References Cited

U.S. PATENT DOCUMENTS

| 2,638,676 | 5/1953 | Callahan | 269/43 |
| 3,015,883 | 1/1962 | Brown | 29/271 |
| 3,318,592 | 5/1967 | Steffen | 269/45 |
| 3,807,017 | 4/1974 | Une et al. | 269/37 |
| 4,263,084 | 4/1981 | Takala | 269/43 |
| 4,674,730 | 6/1987 | Roberts | 269/43 |

FOREIGN PATENT DOCUMENTS

| 55840 | 11/1974 | Australia | 29/270 |
| 523980 | 4/1931 | Germany | 269/37 |
| 3937094 | 5/1990 | Germany . | |
| 4013019 | 10/1991 | Germany . | |
| 9207334 | 11/1992 | Germany . | |
| 9307957 | 7/1993 | Germany . | |
| 405177557 | 7/1993 | Japan | 269/37 |
| 2004964 | 4/1979 | United Kingdom . | |

*Primary Examiner*—Robert C. Watson
*Attorney, Agent, or Firm*—Ratner & Prestia

[57] ABSTRACT

Apparatus for aligning two members (28) includes a first section (63, 67) and a first coupling device (70, 71) for coupling first section (63, 67) to one of the members (28). A second section (61, 62) is provided and a second coupling device (71, 70) to couple the second section (61, 62) to the other of the members 928). A third coupling means (67, 68) movably couples the first and second sections together to facilitate relative movement between the first and second sections to align the two members (28).

10 Claims, 4 Drawing Sheets

APPARATUS FOR ALIGNING TWO MEMBERS

This invention relates to apparatus for aligning two members, such as an alignment tool for aligning objects, for example, pipe, box section, RSJ beam, angle iron, T bar or other items which will not align true without the aid of force.

Aligning the ends of objects which are to be coupled together can be problematic, especially with objects of metal, such as steel. This is a common problem when joining ends of lengths of pipe together to form a pipeline. When the lengths of pipe are coupled together by a bolted flange connection, it may be necessary to rotate the adjacent ends relative to each other, as well as moving the ends linearly with respect to each other in order to align the adjacent ends.

Such misalignments may be caused by reactions in the metal from transformation, for example heat or cold can alter dimensions and alignment of many parts of a construction. Therefore, when coupling one member to another problems can occur.

It is already known to use devices such as chain blocks, pull lifts, cranes and jacks to bring the ends of pipe into alignment.

However, there is the disadvantage that chain blocks, and pull lifts all require anchor points which are in an exact line with the direction of pull or lift required. The anchor points to which the devices are attached must also be capable of sustaining the force about to be applied to them. Cranes have the disadvantage that they may not be able to be located adjacent to the members to be aligned and their lifting capabilities are reduced greatly by their distance from the point of lift. They are also limited by their direction of pull, that is, up only. Jacks have the disadvantage of requiring a level surface strong enough to support the jack and also the surface must be at an angle for the appropriate direction of push required. In addition, conventional methods are time consuming to arrange and operate, and costly.

In accordance with the present invention, apparatus for aligning two members comprises a first section, first coupling means for coupling the first section to one of the members, a second section, second coupling means for coupling the second section to the other of the members, and a third coupling means movably coupling the first and second sections together to facilitate relative movement between the first and second sections to align the two members.

Preferably, the apparatus also comprises actuating means coupled between the first and second sections to move the first and second sections relative to each other. Typically, the actuating means is a linear actuating means, such as a ram or piston device. Typically, the first and second coupling means are adapted to permit pivoting movement of the apparatus relative to the first and second sections to align the two members.

Preferably, the third coupling means facilitates linear movement between the first and second sections.

Typically, the first and second coupling means are removable from the first and second section and preferably, are adjustable on the first and second sections.

The third coupling means may also provide rotational movement of the first and sections relative to each other.

Typically, the two members are longitudinal members, and may be tubular. The two members may be, for example, pipe box section, metal bar, lengths of pipe or structural members, such as beams or supports.

Examples of apparatus for aligning two members in accordance with the invention will now be described with reference to the accompanying drawings, in which.

Figure 1:
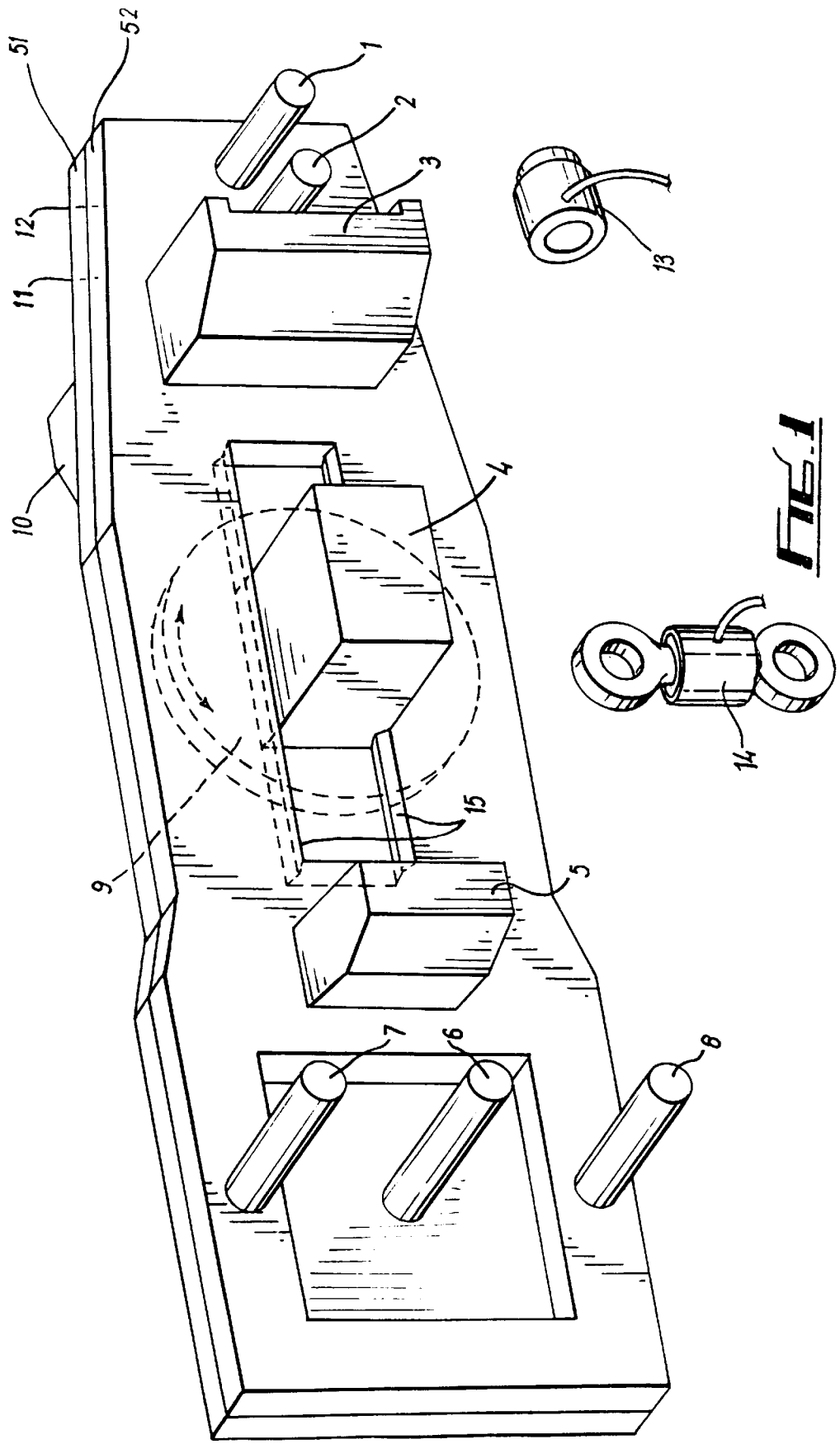
FIG. 1 is a view of a first example of an alignment tool without clamps fitted.

FIG. 1 shows a first example of an alignment tool which has a side 51 and side 52. The sides 51, 52 of the tool are interconnected by a slide 4 mounted on a disc 9. The slide 4 is slidably mounted in slide guides 15 formed on the side 52 and the disc 9 is rotatably mounted on side 51. Hence, side 51 may move linearly with respect to side 52 by movement of slide 4 on the guides 15, and side 51 may rotate relative to side 52 by means of the rotational mounting of side 51 on the disc 9.

The tool has a scissor action of side 51 while side 52 has a forward back sliding movement, therefore giving a 360° clamp movement in opposite directions. The sides 51, 52 are moved relative to each other by a hydraulic ram 13, which may be positioned between the slide 4 and one of anchor points 3 and 5, and a hydraulic ram 14 which may be connected between pegs 6 and 7 or pegs 6 and 8.

Peg 6 is mounted on side 51 and pegs 7 and 8 are mounted on side 52. Hence, a force acting between the pegs 6 and 7 or pegs 6 and 8 will cause relative rotation of the sides 51, 52 about the rotating disc 9.

If side 52 is to be moved to the right as shown in FIG. 1, ram 13 is positioned between anchor point 3 and the slide 4. Hence, by applying hydraulic pressure to ram 13, the side 52 will move to the right and side 51 will move to the left, giving an even spread of load to each side. The movement can be reversed by positioning the ram 13 between the slide 4 and the anchor point 5.

If it is also required to move side 52 so that the right hand end of the side 52 moves down, the ram 14 is positioned between pegs 6 and 7. Hence, by applying hydraulic pressure to ram 14, the right hand end of side 52 will move down, while in return the right hand end of side 51 will move up giving an even spread of load to each side. The movement can be reversed by positioning the ram 14 between the pegs 6 and 8.

Figure 2:
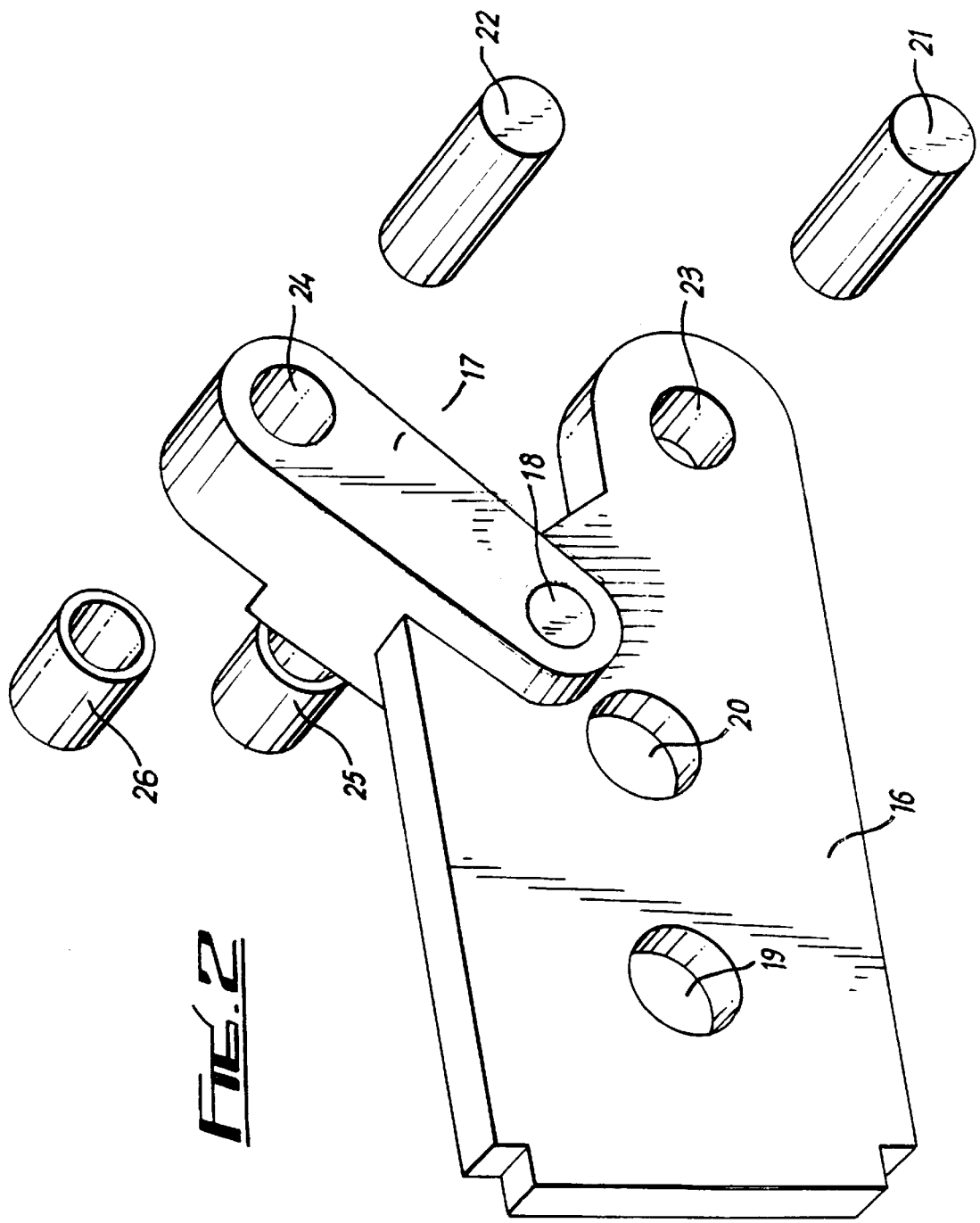
FIG. 2 is a view of a clamp for use with the tool of FIG. 1.

FIG. 2 shows an example of a clamp for use with the tool of FIG. 1. The clamp comprises a body section 16 with a pivotable arm 17 attached to the body 16 by a pivot point 18. The body section has two holes 19, 20 which co-operate with clamp pegs 1, 2 on side 52 of the tool. Pegs 11, 12 identical to the pegs 1, 2 are positioned in a similar position on side 51 but are hidden from view in FIG. 1.

Body member 16 has a further hole 23 into which a peg 21 is inserted and engages with sleeve 25. Similarly, arm 17 has a hole 24 into which peg 22 is inserted and which engages with a sleeve 26.

Two clamps of the form shown in FIG. 2 are provided for use with the tool shown in FIG. 1. One clamp would locate on the pegs 1, 2 on side 52 of the tool and the other clamp would locate on the pegs 11, 12 on side 51 of the tool.

Figure 3:
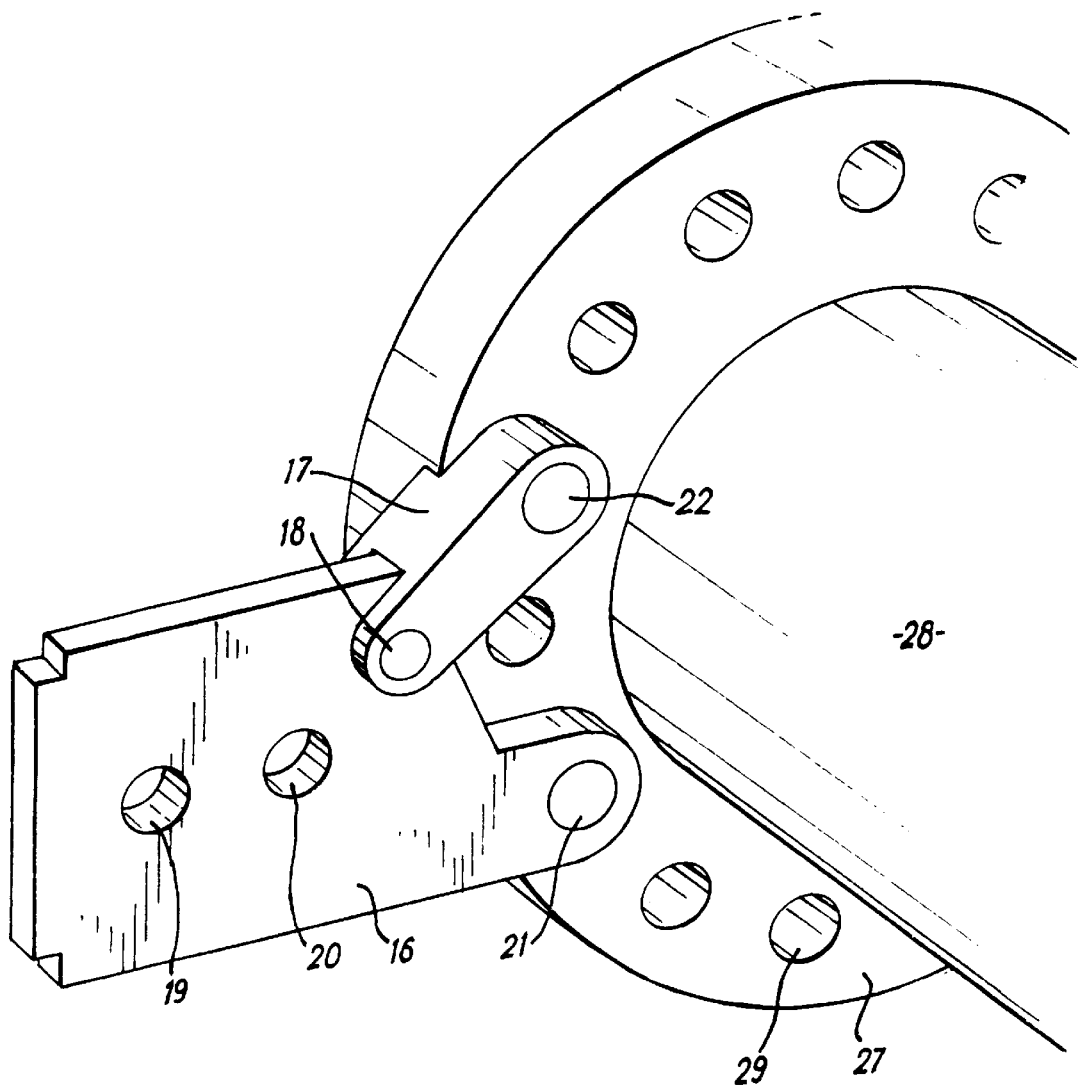
FIG. 3 is a view showing the clamp of FIG. 2 attached to a flanged pipe end.

FIG. 3 shows the clamp of FIG. 2 attached to a flange end 27 of a pipe 28. Clamps attached to each side of 51, 52 are attached in a similar manner to adjacent flanged ends which are to be coupled to each other. The adjacent flange ends 27 are maneuvered and aligned by the use of the hydraulic ram 13 and the hydraulic ram 14 until the pipes 28 are co-axial with each other and bolt holes 29 in the adjacent flange ends 27 are aligned.

An example of use of the tool and clamps described above and shown in FIGS. 1 to 3 will now be described. It is assumed that pipe 28 is a 20" pipe and adjacent flanges 27 on pipe 28 have sprung 1" from alignment during a routine gasket replacement exercise. The alignment tool is coupled to the adjacent flange ends 27 by use of clamps attached to each side 51, 52 of the tool.

Hydraulic ram 13 is then positioned between slide 4 and the anchor point 3 and hydraulic pressure applied to the ram 13 to pull the adjacent flange ends 27 into alignment to permit flange ends 27 to be bolted together.

Figure 4:
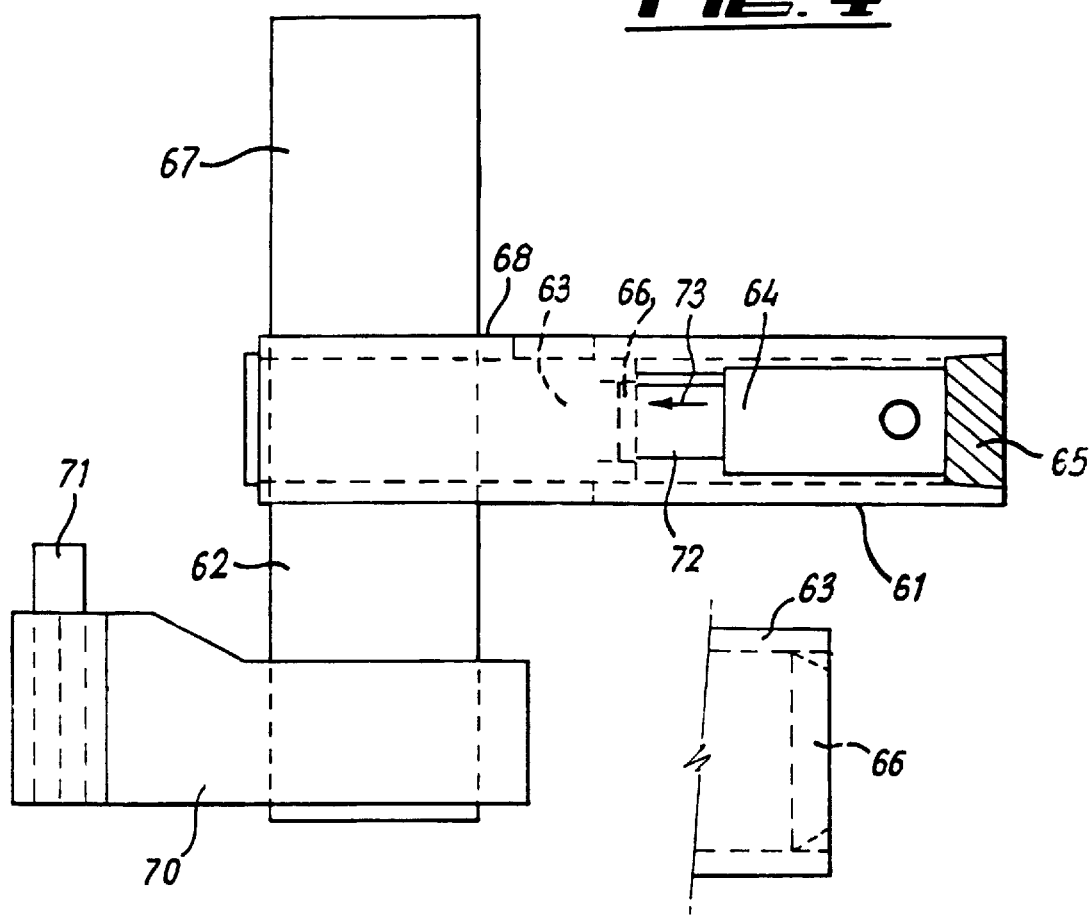
FIG. 4 is a top view of a second example of an alignment tool.
Figure 5:
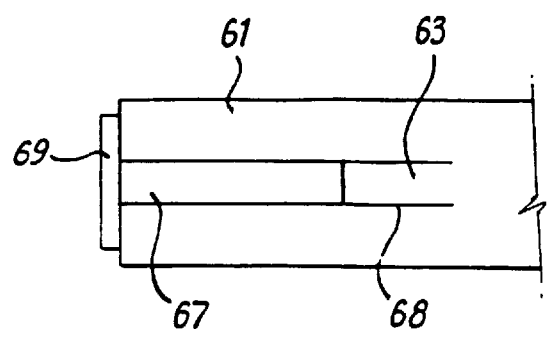
FIG. 5 is a side view of a portion of the tool shown in FIG. 4.

A second example of an alignment tool is shown in FIG. 4 and FIG. 5. This tool comprises an outer cylinder 61 which has a first wing section 62 attached to it adjacent one end. An internal cylinder 63 is slidably mounted within the outer cylinder 61 and a hydraulic ram 64 is located between an end plug 65 of the outer cylinder 61 and an end plug 66 of the inner cylinder 63. Attached to the side of the inner cylinder 63 is a second winged portion 67 which extends at right angles from the curved surface of the internal cylinder 63 through a slot 68 in the outer cylinder 61. The outer cylinder 61 has another end cap 69 fitted adjacent to the slot end of the outer cylinder 61.

Two clamps 70 are provided (only one shown) on each of the wing sections 62, 67. The clamps 70 are provided with slots into which the wings sections 62, 67 slide. The clamps 70 are also provided with pegs 71 which may engage bolt holes in an end flange of a pipe, similar to the pipe 28, end flange 27 and bolt hole 29 shown in FIG. 3.

In use, the alignment tool described above and shown in FIGS. 4 and 5 is operated by inserting the peg 71 into a bolt hole in one of the flanges to be aligned and then inserting wing section 62 into the slot in the clamp 70. A second clamp 70 is then slid onto the second wing section 67 and the peg 71 of the second clamp is inserted into an appropriate bolt hole in the other flange to be aligned.

The tool and clamp 70 should be arranged such that the flange which is furthest away from the tool is attached to the clamp on the wing section 62 and the flange nearest the tool is attached to the clamp 70 on the wing section 67.

The hydraulic ram is then activated by pumping hydraulic fluid into the ram which extends piston 72 to push the wing section 67 in the direction of the arrow 73. This then pushes the wing section 67 towards the position shown in FIG. 4, in which the adjacent flanges will be aligned with respect to each other.

The main objective of the tools described above is to align adjacent ends of pipes, box section RSJ beams, angle iron and T bar. The tool can align and hold in place during assembly (for example bolting and/or welding) or simple internal inspection.

The examples described above have been concentrated on pipe realignment although many other steel ends can be realigned using various clamp designs.

The tool is capable of aligning pipes, ranging from 21" to 36" in diameter and is capable of working at several tons of push, pull, lift and drop.

The tool can be placed on a flange at any point of the circumference irrespective of which direction of push, pull, lift or drop is required as anchor points are not required. This is because the tool uses the problem it faces to its advantage by anchoring itself to the flanges which are out of line. The tool spreads the load equally between the two flanges ensuring that as one is pulled the other is pushed, or as one is lifted and the other is lowered. The tool does the job in hand without the aid of other tools and the working load of the tool remains the same irrespective of which position it is placed.

The advantages of the invention and the ways in which the disadvantages of previously known arrangements are overcome include:

The tool can be placed on a flange at any point of the circumference immaterial of which way push or pull is required. Anchor points are not required elsewhere as the tool uses the problem it faces to its advantage of anchoring itself to the flanges which are out of line, the tool spreads the load equally between the two flanges ensuring as one is pulled the other is pushed.

The tool can be utilized without the aid of other tools and the working load of the tool remains the same, immaterial of which position it is placed.

We claim:

1. Apparatus for aligning adjacent ends of two tubular members, each member having at least one longitudinal axis and each adjacent end having a flange, the flanges being adapted to be coupled to each other to connect the tubular members in end to end relationship, the apparatus comprising a first section, first coupling means for coupling said first section to the flange on one means for coupling said first section to the flange on one of the tubular members, a second section, second coupling means for coupling said second section to the flange on the other of the tubular members, a third coupling means to slidably couple said first and second sections together to facilitate relative movement between said first and second sections, and a linear actuating device located between said first and second sections, said linear actuating device being operable to slide said first and second sections relative to each other in a direction substantially perpendicular to the longitudinal axes of the members to align the flanges.

2. Apparatus according to claim 1, wherein said linear actuating device is a ram device.

3. Apparatus according to claim 1, wherein the third coupling means comprises a guide slot on one of the first and second sections and a projection on the other of the first and second sections which engages the guide slot.

4. Apparatus according to claim 1, wherein the first and second coupling means are movably mounted on the first and second sections.

5. Apparatus according to claim 1, wherein said first section comprises a first cylindrical portion and said second section comprises a second cylindrical portion, said first cylindrical portion being concentrically mounted within said second cylindrical portion to slidably couple said first section to said second section.

6. Apparatus according to claim 1, wherein the longitudinal axes of the members are located at said adjacent ends of the members.

7. Apparatus according to claim 1, wherein the third coupling means incorporates the actuating means.

8. Apparatus according to claim 1, wherein the first section is slidably coupled to the third coupling means to facilitate said relative movement.

9. Apparatus according to claim 1, wherein the first and second sections are coupled to the third coupling means, one of said first and second sections being mounted opposite the other of said first and second sections.

10. Apparatus for aligning adjacent ends of two tubular members, each adjacent end having a flange, the flanges being adapted to be coupled to each other to connect the tubular members in end to end relationship, the apparatus comprising a first section, first coupling means for coupling said first section to the flange on one of the tubular meters, a second section, second coupling means for coupling said second section to the flange on the other of the tubular members, a third coupling means to slidably couple said first and second sections together to facilitate relative movement between said first and second sections, and a linear actuating device located between said first and second sections, said linear actuating device being operable to slide the opposing faces of the flanges to be coupled in a direction substantially parallel to one another to align the flanges.

* * * * *